United States Patent
Kho et al.

(10) Patent No.: US 12,313,472 B2
(45) Date of Patent: May 27, 2025

(54) SENSOR

(71) Applicant: TDK Electronics AG, Munich (DE)

(72) Inventors: Abraham Kho, Singapur (SG); Andi Permana, Kepri (ID); Heinz Strallhofer, Deutschlandsberg (AT)

(73) Assignee: TDK ELECTRONICS AG, Munich (DE)

( * ) Notice: Subject to any disclaimer, the term of this patent is extended or adjusted under 35 U.S.C. 154(b) by 569 days.

(21) Appl. No.: 17/634,603

(22) PCT Filed: Aug. 20, 2020

(86) PCT No.: PCT/EP2020/073409
§ 371 (c)(1),
(2) Date: Feb. 11, 2022

(87) PCT Pub. No.: WO2021/037689
PCT Pub. Date: Mar. 4, 2021

(65) Prior Publication Data
US 2022/0326088 A1  Oct. 13, 2022

(30) Foreign Application Priority Data

Aug. 26, 2019 (DE) .......................... 202019104670.8
Oct. 31, 2019 (DE) .......................... 102019129521.1

(51) Int. Cl.
*G01K 1/08* (2021.01)
*G01D 11/24* (2006.01)
(Continued)

(52) U.S. Cl.
CPC ............ *G01K 1/08* (2013.01); *G01D 11/245* (2013.01); *G01K 7/22* (2013.01); *H01C 7/04* (2013.01)

(58) Field of Classification Search
CPC ... H01C 7/04; G01K 1/08; G01K 7/22; G01D 11/245
See application file for complete search history.

(56) References Cited

U.S. PATENT DOCUMENTS 5,948,989 A  9/1999 Ichikawa
7,969,278 B2 *  6/2011 Kato ........................ H01C 1/14
                                                             338/28

(Continued)

FOREIGN PATENT DOCUMENTS

CN  203551136 U  4/2014
CN  104204745 A  12/2014
(Continued)

OTHER PUBLICATIONS

DE29913950 machine translation. (Year: 2000).*
(Continued)

*Primary Examiner* — Kyung S Lee
(74) *Attorney, Agent, or Firm* — NIXON PEABODY LLP

(57) ABSTRACT

A sensor including a sensor element and electrical leads, whereby the sensor element is connected to the electrical leads. Further, a housing is provided, whereby the housing has an opening, and the sensor element is arranged in the housing such that the electrical leads protrude from the opening. The housing is filled with epoxy resin and the epoxy resin fixes the sensor element and the electrical leads in the housing.

16 Claims, 2 Drawing Sheets

(51) Int. Cl.
   *G01K 7/22*   (2006.01)
   *H01C 7/04*   (2006.01)

(56) References Cited

U.S. PATENT DOCUMENTS

| | | |
|---|---|---|
| 2004/0182163 A1 | 9/2004 | Yamashita |
| 2006/0013282 A1* | 1/2006 | Hanzawa .................. G01K 7/22 |
| | | 374/E1.021 |
| 2007/0110124 A1 | 5/2007 | Shiraki |
| 2012/0173032 A1 | 7/2012 | Pamulaparthy |
| 2013/0019461 A1 | 1/2013 | Rudmann |
| 2013/0208765 A1* | 8/2013 | Takahashi ................ G01K 7/22 |
| | | 374/185 |
| 2013/0248777 A1* | 9/2013 | Sgriccia ..................... H01B 1/02 |
| | | 252/514 |
| 2015/0023391 A1 | 1/2015 | Sannier et al. |
| 2016/0178445 A1* | 6/2016 | Shiraki .................... G01K 1/08 |
| | | 374/208 |
| 2016/0258818 A1 | 9/2016 | Ihle |
| 2016/0265979 A1 | 9/2016 | Ihle |
| 2019/0120697 A1 | 4/2019 | Suzuki |
| 2021/0404882 A1* | 12/2021 | Suzuki .................... G01K 1/08 |

FOREIGN PATENT DOCUMENTS

| | | |
|---|---|---|
| CN | 205262633 U | 5/2016 |
| CN | 107860480 A | 3/2018 |
| DE | 102011008179 A1 | 7/2012 |
| EP | 2527793 A1 | 11/2012 |
| EP | 2995918 A1 | 3/2016 |
| JP | H03-85714 A | 4/1991 |
| JP | H11072402 A | 3/1999 |
| JP | 2004-279371 A | 10/2004 |
| JP | 2005-024344 A | 1/2005 |
| JP | 2010-151805 A | 7/2010 |
| JP | 2011-027576 A | 2/2011 |
| JP | 2012-141307 A | 7/2012 |
| JP | 2014-521226 A | 8/2014 |
| JP | 2015-534085 A | 11/2015 |
| JP | 2016-119353 A | 6/2016 |
| JP | 6360273 * | 7/2018 |
| JP | 2018-179875 A | 11/2018 |
| JP | 2019-020251 A | 2/2019 |

OTHER PUBLICATIONS

CN106225945 machine translation. (Year: 2018).*
DE69827221 machine translation. (Year: 2005).*
JP6360273, machine translation. (Year: 2018).*
Examination Report in Japanese Patent Application No. 2022-513344, dated Apr. 4, 2023, in Japanese (7 pages).
Notice of Allowance in Japanese Patent Application No. 2022-513344, dated Jul. 18, 2023, in Japanese (3 pages).
International Search Report and Written Opinion of International Searching Authority corresponding to International Patent Application No. PCT/EP2020/073409, mailed Nov. 17, 2020 (8 pages).

* cited by examiner

SENSOR

CROSS-REFERENCE TO RELATED APPLICATIONS

This application is a U.S. National Stage of International Application No. PCT/EP2020/073409, filed Aug. 20, 2020, which claims the benefit of and priority to Germany Patent Application No. 202019104670.8, filed Aug. 26, 2019, and Germany Patent Application No. 102019129521.1, filed Oct. 31, 2019, all of which are incorporated herein by reference in their entireties.

The present invention concerns a sensor. In addition the present invention relates to an arrangement employing the sensor and a method for assembling the sensor.

Nowadays, sensors are utilised in nearly all kind of new applications and gadgets. Accounting just smart sensor, the sales quantity worldwide has increased from 6 billion sensors in 2010 to estimated 26 billion in 2019.

A modern smartphone by itself has often at least a proximity sensor, a brightness sensor, a tilt sensor a rotational sensor, an accelerometer, a GPS-sensor, a magnetic sensor and a thermometer build in.

For sensors it is desirable to find a design to protect the sensor on one hand and to provide a reliable, reproducible measurement of the sensor on the other hand.

The object of the present invention is to provide a sensor that is robust, protected and allows for reliable measurements.

The object is solved by a sensor according to claim 1. Further advantageous designs and potential arrangements can be found in the pending claims.

A sensor is provided which comprises a sensor element and electrical leads, whereby the sensor element is connected to the electrical leads. Further, a housing is provided, whereby the housing has an opening and the sensor element is arranged in the housing such that the electrical leads protrude from the opening. The housing is filled with the epoxy resin and the epoxy resin fixes the sensor element and the electrical leads in the housing.

Common filling materials for sensors, as alumina oxide or silicon oxide for example, need a solvent as toluene, xylene or IPA to be processed. As a consequence, voids, vesicles and bubbles occur after curing, which cannot be avoided. These inclusion leads to an inhomogeneous surrounding of an employed sensor element. As a result, measurements taken with the sensor fluctuates strongly depended on the number and the spatial distribution of the inhomogeneities in the filling material. Therefore, in these sensors the response time and the measured value varies and allows no reliable measurement. By employing epoxy resin as the filling and fixing material in the housing of the sensor, voids, vesicles and other inhomogeneities are avoided. Epoxy resin does not use a solvent and hence avoid voids and bubbles. The homogenous epoxy resin causes a homogenous heat transfer from the environment to the sensor element resulting in a fast thermal response and less variations in the response time of the sensor. As a consequence the reliability of the measurement of a sensor according to the present invention is improved.

The sensor element can be a NTC sensor element. As NTC sensors are used to measure the temperature of the surrounding, it is demanded to enable a direction-independent measurement. Especially in security systems which are triggered by a rise in temperature, it is necessary to allow for a reliable and direction-independent measurement. Alternately the sensor element can be a PTC sensor element or a sensor element using the temperature dependence of the electrical resistance of platinum.

Preferably, the housing can have two portions, a first portion which comprises the opening and a second portion opposing the side of the opening, whereby the second portion can have a smaller diameter than the first portion and the sensor element can be arranged in the second portion of the housing. A sensor element arranged in the second portion has less material surrounding it compared to the first portion. This allows a higher measurement accuracy as well as a shorter response time for the sensor. At the same time the first portion of the housing, with a larger diameter, provides means for a better handling of the sensor and stabilizes the leads connected to the sensor element. Another advantage of the shape of the housing with two portions is that the sensor and the direction it is facing can be easily recognised by a machine, as a pick-and-place machine, and therefore can be easily processed.

Furthermore, the housing's outer shape can be not radial symmetrical. Moreover, the housing can have a longitudinal axis and the housing can be not radial symmetric with respect to rotations around its longitudinal axis by a rotational angle other than 180°. Accordingly, the direction the sensor element is facing in the housing as well as the direction of the housing in a device can be determined and fixed relatively to rotational asymmetry. The signal output of sensor elements often are not just dependent on the distance to an event measured but also on the angle the sensor element faces that event. For example, a NTC sensor element that faces a heat source directly will be exposed to more thermal energy than a NTC sensor that is orientated perpendicular to the heat source. By determining the direction of the sensor element in the housing and the direction of the housing in a device by its outer shape it is ensured that the sensor element works and measures reliable and reproducible values. Furthermore, the housing with a not radial symmetrical outer shape complies poka yoke. While assembling a device the sensor is used in, mistakes can be avoided by using a suitable connection to the housing.

Additionally, the contour of the housing can have at least two flattened segments which are opposite to each other. The sensor can securely be picked at the flattened segment as the flattened segment provide means for a stable grip. Hence, the sensor also can easily be mounted and installed in a device by a pick-and-place machine.

The housing may have two grooves on an inner surface of the housing which extend from the opening along a longitudinal axis into the housing. Inside the grooves the electrical leads connected to the sensor element can be arranged. In this way the orientation of the sensor element inside the housing is fixed relatively to the housing.

Moreover, the electrical leads may be kinked in a portion of the electrical leads that are located inside of the housing. By kinking the leads it can be ensured that both leads do not contact each other and do not short-circuit. Besides, kinking the leads may induce a lateral force to support the latching of the electrical leads in potential grooves on the inside of the housing. Likewise, the spring tension of the electrical leads generated by kinking is helpful to handle the sensor element during the potting process wherein the sensor element is deposited into the housing as well as to handle the whole sensor if the sensor is mounted or installed into an application.

A wall thickness of the housing can be less than 2 mm. On the one hand, the wall thickness of the housing should be thick enough to protect the sensor element inside the housing. On the other hand, the housing should not isolate the environment from the sensor element in order not to impair the sensitivity of the sensor. A wall thickness of less than 2 mm has proven to be advantageous. A wall thickness of less than 1 mm and more than 0.5 mm is particularly advantageous.

The housing can be made out of metal. The housing exhibits good stability even with a small wall thickness, if it is made of metal. In addition, it is resistant to harmful external environmental influences. If an NTC sensor element or another temperature measuring sensor element is used, a metal housing material is particularly suitable as it has a high thermal conductivity. This allows a temperature sensor to be made more sensitive.

Contrariwise, it can be beneficial to make the housing out of a metal oxide. Metal oxides also have the advantageous properties of a high stability and relatively high thermal conductivity. In addition, they are also good electrical insulators, so that a sensor with such a housing is also suitable for high-voltage applications. However, a few kV voltages can lead to short circuits, especially between the protruding leads and the housing, if the housing consists of an electrical conductor. As a metal oxide is used as housing material, the sensor can be operated with a voltage of up to 10 kV.

The epoxy resin filled in the housing can be a two component epoxy resin. The two component epoxy resin consists of an epoxy resin and polyfunctional curative or a hardener as acids, acid anhydrides, phenols, alcohols, amines, and thiols. Variation of epoxy resin to hardener ratio can influence hardness, elasticity, humidity resistance, acid resistance and other properties. By using a two component epoxy resin, the sensor can be customized for the sensor element applied and the device the sensor is meant for.

Besides, a material encapsulating the sensor element can be the same material which touches the inside of the housing and fixes the sensor element with the housing. By using the same material inside the housing a boundary surface, which would occur if two different materials were used and would be hindering, is omitted.

The sensor can be suitable for being mounted by a pick-and-place machine. In this manner, the processing time to install the sensor in a device can be reduced due to the automatization. As the sensor according to the present invention measures more reliable than common sensor large numbers of improved applications and gadgets can be produced.

An arrangement, comprising a sensor according to one of the previous claims and a printed circuit board (PCB), whereby the sensor can be arranged on the PCB and can be electrically connected to the PCB, can be beneficial. PCB are equipped with a high number of heat generating components, as resistors, coils or chips such as processors. Being able to monitor the properties of this components, as the temperature, improves the security as the device employing the PCB can be shut down after a temperature rise. The sensor according to the present invention is especially suitable, as it measures more reliable.

Likewise, a smart power meter comprising a sensor according to the present invention or an arrangement comprising a sensor according to the present invention, can be opportune. In smart power meters, in particular for buildings, high currents and voltages occur as the electricity from the power grid is distributed to the different households. For this reason any casualty, as a broken wire or corrosion, can lead to a catastrophic failure as a fire. Thus, a sensor that can reliably measure disturbances, as heat generation, can be used to warn or to shut down the power.

One advantage of the described sensor is that the assembling thereof can be done with a secure method.

The method comprises the following steps:
a) Connecting a sensor element to electrical leads by e.g. soldering,
b) Dipping the sensor element into epoxy resin,
c) Curing the epoxy resin on the sensor element,
d) Arranging the sensor in a housing which has an opening such that the electrical leads protrude from the opening,
e) Filling the housing with epoxy resin,
f) Curing the epoxy resin in the housing.

The process minimizes the loss rates in the assembling process. By dipping the sensor element into epoxy resin and curing it afterwards in step b) and c) the connection strength between the sensor element and the leads is improved. The curing can be done at 80° C. for 3 h, for example. Therefore, the connection between sensor element and the leads has a much lower risk to break when the sensor element is arranged in the housing in step d). Besides, the sensibility of the sensor is improved because the same material, epoxy resin, is used to encapsulate the sensor element with the electrical leads and to fill the housing. By using the same material a boundary surface, which would occur if two different materials were used and would be hindering, is omitted. As a consequence, the sensor element is more sensible and has a shorter response time to e.g. arising temperature differences.

In the following the invention and a method of manufacture is described based on embodiments with reference to the figures. Same parts or parts with equivalent effect are referred to by the same reference numbers.

The figures serve solely to illustrate the invention and are therefore only schematic and not drawn to scale. Some parts may be exaggerated or distorted in the dimensions. Therefore, neither absolute nor relative dimensions can be taken from the figures. Identical or identically acting parts are provided with the same reference numerals.

Figure 1:
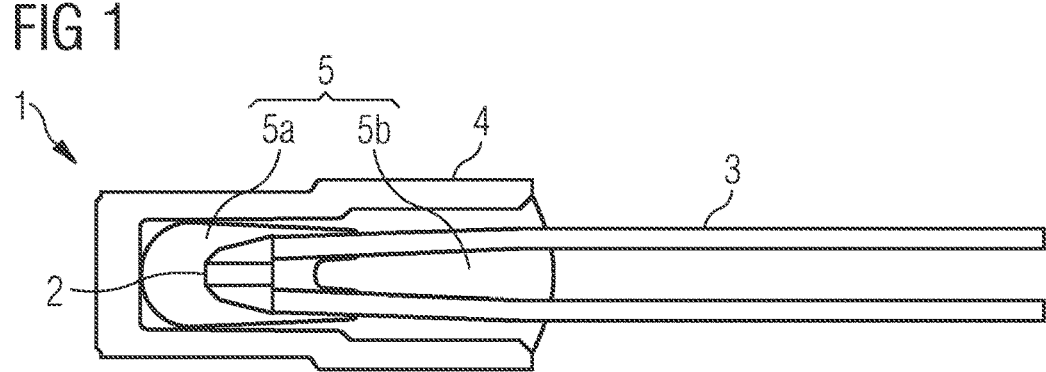
FIG. 1 shows a simplified cross section of a first embodiment of a sensor according to the present invention.

In FIG. 1 a simplified cross section of a sensor 1 according to a first embodiment of the present invention is shown. A sensor 1 comprises a sensor element 2 and electrical leads 3. The sensor element 2 is connected to the electrical leads 3 by e.g. soldering. Inside a housing 4, which has an opening, the sensor element 2 is arranged such that the electrical leads 3 protrude from the opening of the housing 4. Hence the sensor 1 can easily be installed and connected in a device. The housing 4 is filled with an epoxy resin 5 and the epoxy resin 5 fixes the sensor element 2 and the electrical leads 3 in the housing 4.

In particular, the sensor element 2 that is connected to the electrical leads 3 is first dipped into epoxy resin and cured which forms an epoxy resin encapsulation 5a. Afterwards, the encapsulated sensor element 2 is arranged in the housing 4 and the housing 4 is filled with an epoxy resin filling 5b. Together, the epoxy resin encapsulation 5a and the epoxy resin filling 5b form the epoxy resin 5 inside the housing 4. In this way, the material encapsulating the sensor element 2 is the same material which touches the inside of the housing 4 and fixes the sensor element 2 within the housing 4. By using the same material inside the housing a boundary surface, which would occur if two different materials were used and would be hindering, is omitted.

Usually, materials, like metal oxides, are used for sensors. In particular for temperature sensors, as they provide and relatively high heat conductivity. These material require a solvent as toluene, xylene or IPA to be processed. Therefore, voids, vesicles and bubbles occur during curing, which cannot be avoided. These inclusions cause an inhomogeneous surrounding of the sensor element 2. Measurements taken with a sensor 1, which has inhomogeneities around the sensor element 2, fluctuate strongly depended on the number and the spatial distribution of the inhomogeneities in the filling material. As a consequence, in common sensors the response time and the measured value varies and allows no highly reliable measurements. In sensors 1 which use epoxy resin 5 as a filling and fixing material in the housing 4 of the sensor 1, voids, vesicles and other inhomogeneities are avoided. As a consequence the reliability and reproducibility of the measurement of a sensor 1 according to the present invention is improved. In other respects epoxy resin 5, and thereby also the sensor 1 is less sensitive to humidity and can work more reliable in humid surrounding.

The sensor element 2 in FIG. 1 is a NTC sensor element 2. NTC sensor elements 2 measure the temperature of the environment. Therefore, direction-independent measurements are desirable for NTC sensors. In particular security systems triggered by a temperature rise require reliable and direction-independent measurements to provide a reproducible behaviour in case of an emergency.

The epoxy resin 5, the housing 4 is filled with, is a two component epoxy resin 5. The epoxy resin 5 consists of an epoxy resin component and a hardener. As a hardener acids, acid anhydrides, phenols, alcohols, amines, and thiols can be used. By changing the epoxy resin component to hardener ratio hardness, elasticity, humidity resistance, acid resistance and further properties of the epoxy resin 5 are modified. Therefore, the sensor 1 according to the present invention can be customized for the sensor element 2 applied and the application the sensor 1 is meant for by optimizing the ratio of the two component epoxy resin 5.

Figure 2:
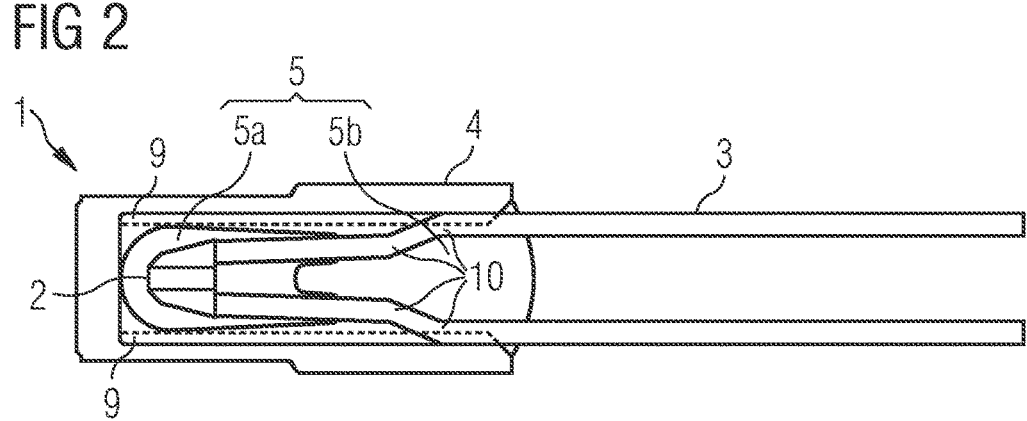
FIG. 2 shows a simplified cross section of a sensor according to second embodiment of the present invention.

In FIG. 2 a simplified cross section of a second embodiment of a sensor 1 according to the present invention is shown. Materials, dimensions and functionality are similar to the first embodiment shown in FIG. 1.

The inner diameter of the housing 4 in the second embodiment is the same for the first and the second portion as distinguished from the first embodiment. This allows to arrange two grooves 9 on an inner surface of the housing 4 which extend from the opening along a longitudinal axis till the bottom of the housing 4. Alternatively, the grooves may just be in a part of the housing as in the first portion forming the opening. Additionally, the electrical leads 3 have each two kinks 10 in portions inside the housing 4. Thereby, the electrical leads 3 form spring like elements forcing each other apart. As a consequence, both electrical leads 3 are spread apart and unlikely short-circuit. In the same way the lateral force caused by the kinks 10 of the electrical leads 3 presses the electrical leads 3 into the grooves 9 on the inside of the housing 4. In this manner the orientation of the sensor element 2 is fixed compared to the housing 4. Additionally, the lateral force applying on the electrical leads 3 is convenient during the potting or mounting process as it facilitates to handle the sensor 1 or the sensor element 2.

Figure 3:
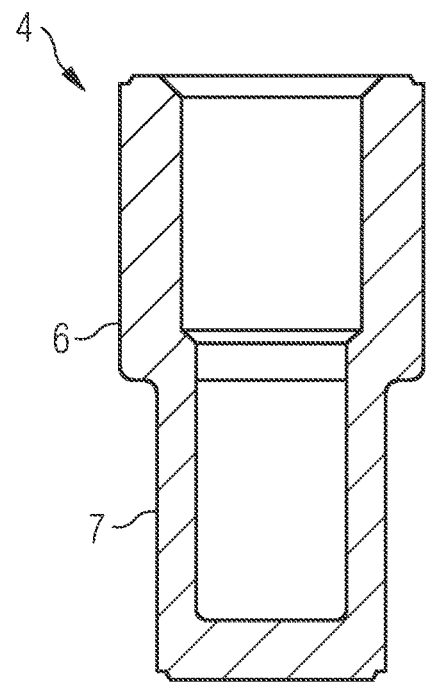
FIG. 3 shows a cross section of the first embodiment of a housing for a sensor according to the present invention.

In FIG. 3 a cross section of the housing 4 for a sensor 1 according to the first embodiment of present invention is presented. The housing 4 has two portions, a first portion 6 which comprises the opening, on the upper side, and a second portion 7 opposing the side of the opening, whereby the second portion 7 has a smaller diameter than the first portion 6. The sensor element 2 is arranged in the second portion 7 of the housing 4 which has a smaller diameter. As the sensor element 2 has less material surrounding it, compared to the second portion 7, a higher measurement accuracy and faster response time for the sensor 1 are provided. The first portion 6 of the housing 4, which has a larger diameter, stabilizes the electrical leads 3 connected to the sensor element 2. Additionally, the wall thickness of the second portion 7 of the housing 4 is smaller than the wall thickness of the first housing 4 to improve the thermal conductivity from the surrounding to the sensor element 2 and improve the response time of the sensor 1.

The wall thickness of the housing 4, shown in FIG. 3, is 0.7 mm. The wall thickness of the housing 4 should be robust enough to withhold pressure applied to the sensor 1 while installing or mounting it to protect the sensor element 2. Apart from that the housing 4 is required to connect the environment thermally to the sensor element 2 to provide a high sensitivity. Wall thicknesses of less than 2 mm have shown to be advantageous, especially for temperature sensors. A wall thickness of less than 1 mm and more than 0.5 mm, as 0.7 mm in FIG. 3, is particularly advantageous.

Figure 4:
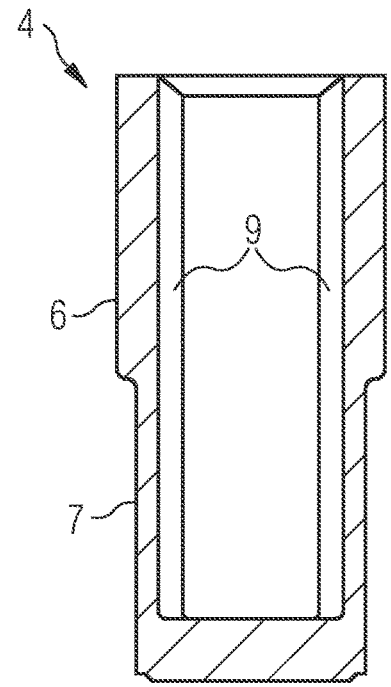
FIG. 4 shows a cross section of a housing for a sensor according to the second embodiment shown in FIG. 2.

FIG. 4 shows a cross section of a housing 4 for a sensor 1 according to the second embodiment also shown in FIG. 2. Compared to the cross section of the first embodiment shown in FIG. 3, the housing 4 exhibits the same inner diameter in the first and the second portion of the housing 4. The two grooves 9 arranged on the inner surface of the housing 4 are stretched over the whole length of the housing 4 from the opening to the bottom. Alternatively, the grooves 10 may just be in a part of the housing 4 as in the first portion forming the opening, for example.

Figure 5:
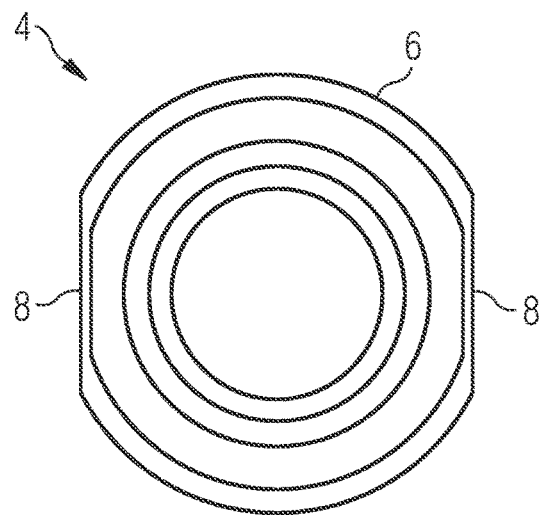
FIG. 5 shows a plain view of a housing for the first embodiment of a sensor according to the present invention.

In FIG. 5 a plain view of the housing 4 for a sensor 1 according to the first embodiment of the present invention is shown. It shows the first portion 6 of the housing 4 which forms a round opening in the middle. The outer shape and contour of the first portion 6 is not radial symmetrical. The contour of the housing 4 has two flattened segments 8 which are opposite to each other. In this way the sensor 1 can be securely picked at the flattened segment 8, as the flattened segment 8 provide means for a stable grip. Hence, the sensor 1 also can easily be mounted and installed in a device by a pick-and-place machine.

By employing a not radial symmetrical housing 4, the direction the sensor element 2 is facing in the housing 4 as well as the direction of the housing 4 in a device is determined and fixed. As a consequence the position and the direction of the sensor 1 is exactly the same in a device. Sensor elements 2 often are very dependent on the angle they face an event they are supposed to measure. As an example, a planar temperature sensor element 2 that faces a heat source with its large surface will absorb more thermal energy than a NTC sensor that is orientated perpendicular to the heat source. By determining the direction of the sensor element 2 in the housing 4 and the direction of the housing 4 in a device by its outer shape and contour it is ensured that the sensor element 2 and thereby the sensor 1 itself works and measures reliable and reproducible values.

Figure 6:
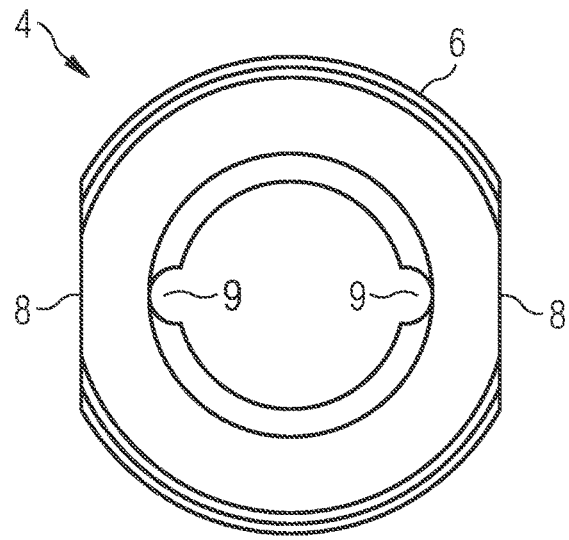
FIG. 6 shows a plain view of a housing for a sensor according to the second embodiment shown in FIG. 2.

In FIG. 6 a plain view of a housing 4 for a sensor 1 according to the second embodiment, also shown in FIGS. 2 and 4, is presented. The main difference in contrast to the first embodiment shown in FIG. 5 are two grooves 9 that are arranged in the inner surface of the housing 4. The grooves 9 are located central relatively to the flattened segments 8 that are part of the outer contour of the housing 4. As the electrical leads 3 are supposed to latch into the grooves 9 and the grooves are fixed compared to the flattened segment 8, the orientation of the sensor element 2 in the housing 4 is predetermined relatively to the flattened segments 8. In this way it is ensured that the sensor 1 measures reproducible in a given environment where to orientation and location of the housing is specified.

Figure 7:
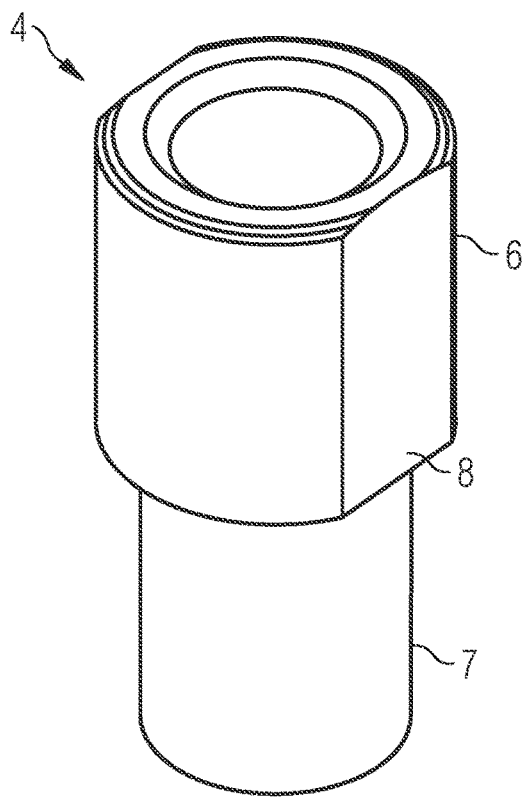
FIG. 7 shows a perspective view of a housing for the first embodiment of a sensor according to the present invention.
Figure 8:
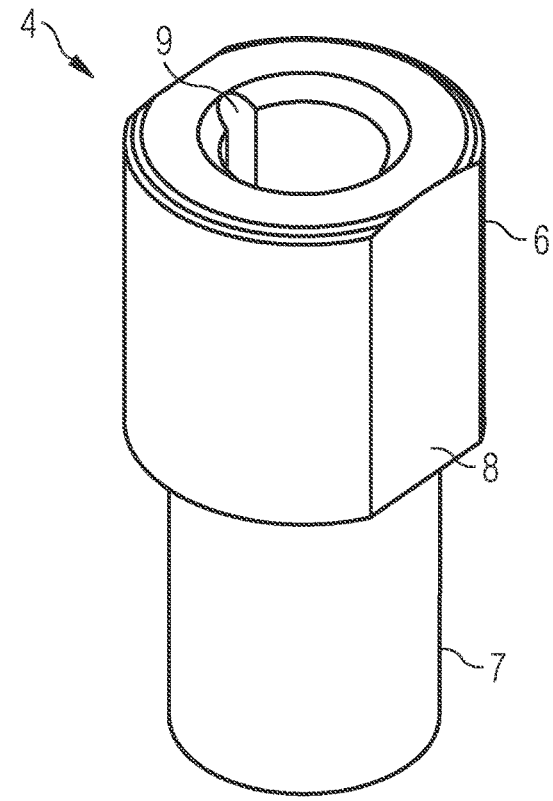
FIG. 8 shows a perspective view of a housing for a sensor according to the second embodiment shown in FIG. 2.

FIG. 7 shows a perspective view of the housing 4 for a sensor 1 shown in FIGS. 3 and 5. As described for FIGS. 3 and 5, the housing 4 has two portions, is not radial symmetrical and has two flattened segments 8 on the first portion 6. It is made out of alumina oxide, which is a metal oxide, with 96% alumina and 4% oxygen. Metal oxides offer a high stability and relatively high thermal conductivity. Moreover, metal oxides are electrical insulators. Therefore, the sensor 1 with a housing 4 made of a metal oxide is convenient for high-voltage applications. As a high voltage applied to the electrical can easily cause short circuits, especially between the protruding electrical leads 3 and the housing 4, a housing 4 made of an electrical insulator can be beneficial. The sensor 1 employing the housing 4 shown in FIG. 7, which is made out of a metal oxide, can be operated with a voltage of up to 10 kV. In a second embodiment shown in FIG. 8 a similar housing as in FIG. 7 is shown. Both embodiments differ in the two grooves 9 that are disposed in the inners surface of the housing 4. The electrical leads 3 can latch into this grooves 9 and fix thereby the orientation of the sensor element 2 in the housing 4.

In another embodiment, depending on the application, the housing 4 can be made out of metal. Metal is robust and provides a great thermal conductivity. In addition, it is resistant to harmful external environmental influences. Especially in thermal sensors, a metal housing material can be suitable as such a sensor 1 is more sensitive.

REFERENCE LIST 1 sensor
2 sensor element
3 electrical leads
4 housing
5 epoxy resin
5a epoxy resin encapsulation
5b epoxy resin filling
6 first portion
7 second portion
8 flattened segment
9 groove
10 kink

The invention claimed is:

1. A sensor, comprising:
    a sensor element;
    electrical leads, the sensor element being connected to the electrical leads;
    a housing, the housing having an opening and the sensor element being arranged in the housing such that the electrical leads protrude from the opening, the housing having two grooves on an inner surface of the housing, the two grooves extending from the opening along a longitudinal axis into the housing;
    epoxy resin, the housing being filled with the epoxy resin and the epoxy resin fixing the sensor element and the electrical leads in the housing; and
    wherein the electrical leads have kinks in a portion that is located inside the housing;
    wherein the electrical leads are arranged in the grooves, and a lateral force is generated by the kinks of the leads and supports a latching of the electrical leads in the grooves.

2. The sensor according to claim 1, whereby the sensor element is a NTC sensor element.

3. The sensor according to claim 1, whereby the housing has two portions, a first portion which comprises the opening and a second portion opposing the opening, and
    whereby the second portion has a smaller diameter than the first portion and the sensor element is arranged in the second portion of the housing.

4. The sensor according to claim 1, whereby the housing's outer shape is not radial symmetrical.

5. The sensor according to claim 1, whereby the contour of the housing has at least two flattened segments which are opposite to each other.

6. The sensor according to claim 1, whereby the housing has two grooves on an inner surface of the housing which extend from the opening along a longitudinal axis into the housing.

7. The sensor according to claim 1, whereby the electrical leads have kinks in a portion that is located inside of the housing.

8. The sensor according to claim 1, whereby a wall thickness of the housing is less than 2 mm.

9. The sensor according to claim 1, whereby the housing is made out of metal.

10. The sensor according to claim 1, whereby the housing is made out of a metal oxide.

11. The sensor according to claim 1 whereby the epoxy resin is a two component epoxy resin.

12. The sensor according to claim 1, whereby a material encapsulating the sensor element is the same material which touches the inside of the housing and fixes the sensor element with the housing.

13. The sensor according to claim 1, whereby the sensor is suitable for being mounted by a pick-and-place machine.

14. The arrangement, comprising:
    a sensor according to claim 1,
    a printed circuit board (PCB),
    whereby the sensor is arranged on the PCB and is electrically connected to the PCB.

15. The smart power meter comprising a sensor according to claim 1 or an arrangement according to claim 14.

16. The sensor according to claim 1,
    wherein the epoxy resin is a two-component epoxy resin which consists of an epoxy resin and a polyfunctional curative or a hardener.

* * * * *